Apr. 3, 1923.

G. T. ARTHUR 1,450,478

TRACK LINK

Filed Aug. 15, 1918

INVENTOR.
George T. Arthur.
BY
Strong & Townsend
ATTORNEYS

Patented Apr. 3, 1923.

1,450,478

UNITED STATES PATENT OFFICE.

GEORGE T. ARTHUR, OF STOCKTON, CALIFORNIA, ASSIGNOR TO THE HOLT MANUFACTURING COMPANY, OF STOCKTON, CALIFORNIA, A CORPORATION OF CALIFORNIA.

TRACK LINK.

Application filed August 15, 1918. Serial No. 249,948.

*To all whom it may concern:*

Be it known that I, GEORGE T. ARTHUR, a citizen of the United States, residing at Stockton, in the county of San Joaquin and State of California, have invented new and useful Improvements in Track Links, of which the following is a specification.

This invention relates to a track link adapted to form a part of a chain track for tractors.

It is the principal object of this invention to provide a chain track for tractors of the self-laying track type which is formed of a series of articulated links, each of which has an individual oil reservoir by which the link pins and their antifriction bearings may be lubricated; the links being further constructed with removable grouser plates overlapping at their adjacent ends to form a continuous track surface.

The invention is illustrated by way of example in the accompanying drawings in which—

Figure 3:
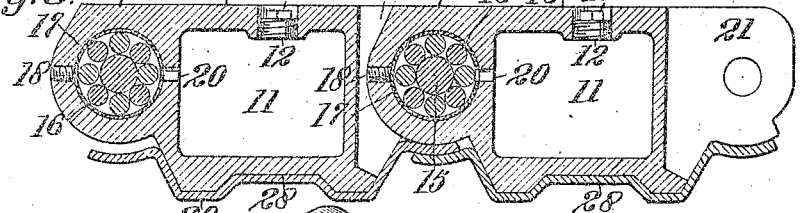
Fig. 3 is a view in section, as seen on the line 3—3 of Fig. 2.
Figure 4:
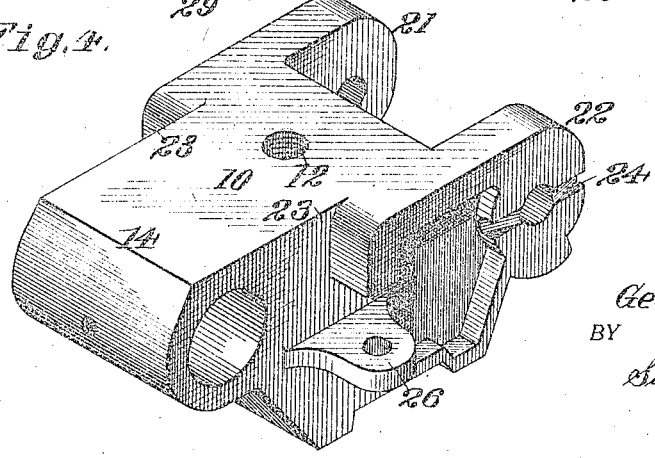
Fig. 4 is an enlarged view in perspective, disclosing one of the links.

Referring more particularly to the drawings, 10 indicates a link block, the central portion of which is substantially rectangular in shape and thus forms an oil reservoir 11. This reservoir may be filled with a lubricant through an opening 12, normally closed by a screw plug 13. At one side of the block is a central bearing 14 through which a link pin 15 is mounted. The bearing has a bore of larger dimensions than the diameter of the pin and thus accommodates a series of antifriction rollers 16, particularly shown in Fig. 3 as supporting the pin. These rollers are positioned within a cage 17, held in place by a set-screw 18. The cage is fitted at its opposite ends with dust-proof packing rings 19. An opening is formed through one side of the cage and is in register with an oil duct 20 which extends through the wall of the block and communicates with the oil reservoir 11.

Figure 1:
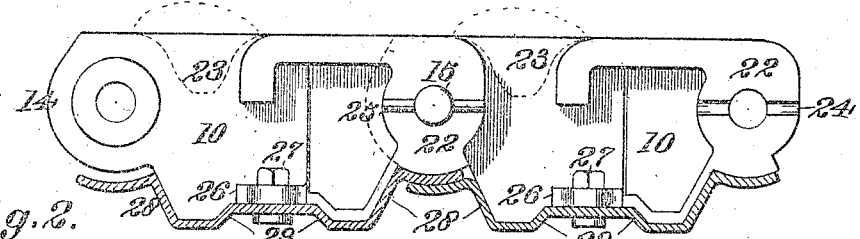
Fig. 1 is a sectional view in elevation taken on the line 1—1 of Fig. 2, disclosing the completely assembled links and indicating the grouser plates in section.
Figure 2:
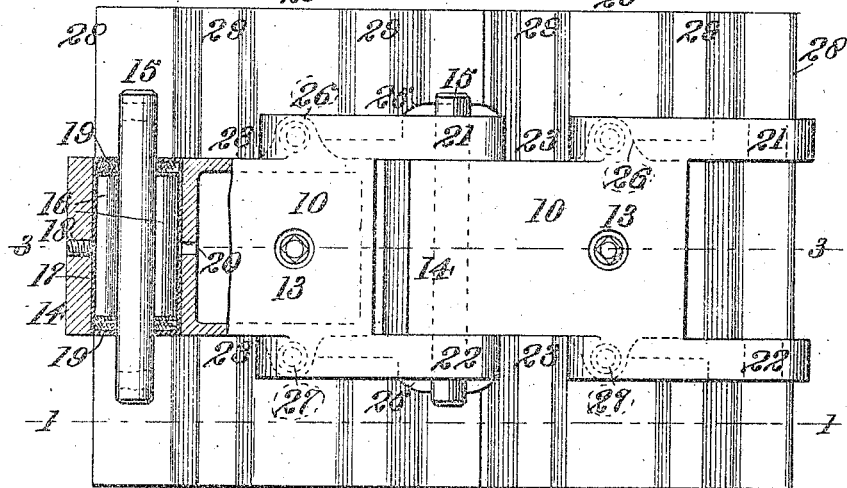
Fig. 2 is a view in plan, illustrating the elements shown in Fig. 1 and further disclosing the bearing afforded the link pins.

The opposite end of each of the blocks is formed with a pair of projecting lugs 21 and 22 which are spaced in relation to each other to receive the bearing 14. These lugs extend alongside the main body of the block and are curved downwardly at their opposite ends to form a toothed pocket 23 for sprocket teeth, as indicated by dotted lines in Fig. 1. The upper faces of the lugs and in their extensions are in the same plane as the face of the block and thus form a continuous rail over which the truck rollers of the tractor may pass. The lugs 21 and 22 are suitably bored to accommodate the outwardly projecting ends of the pin 15 and are also formed with a transverse groove 24. This groove extends across the outer face of each of the lugs and through the central axis of each bore.

Lock pins 25 are adapted to be driven through slots in the ends of the hinge pins and thus will hold the pins against rotation. This will fix the pins to move with the lugs and will insure that the bearing 14 will rotate around the pin.

At the opposite sides of the main bearing block are formed outwardly extending ears 26, through which bolt holes are made. These ears are adapted to receive fastening bolts 27 which pass through the grouser plates 28. These plates may be formed of any desired configuration, but are here shown as having a pair of laterally extending cleat faces 29, between which the bolt 27 occurs. The opposite ends of the plates extend upwardly and terminate in arcuate portions concentric with the axis of the link pins. The contiguous ends of the grousers also overlap, as clearly shown in Fig. 1, and thus protect the hinge joint of the links from dirt and other foreign substance.

In operation, the links are assembled to form a continuous chain which easily passes over idler wheels at the forward end of the tractor and driving sprockets at the rear end of the tractor. In the present instance these sprockets are arranged in pairs so that their teeth will register with the pockets 23 at the opposite sides of the link bodies. As the reservoirs 11 are filled with oil a continuous operation of the links and their change in position during their course of travel will cause oil from the reservoir to pass through the ducts 20 and lubricate the roller bearings included within the bearing 14 of each link.

It will thus be seen that the link structure here disclosed is simple and that it may be readily manufactured without requiring expensive machine operations and when in action will afford suitable lubrication for each of its hinge joints.

Having thus described my invention, what I claim and desire to secure by Letters Patent is—

1. A track link comprising a rectangular body portion, an oil reservoir in one end thereof, a laterally extending bearing through the opposite end thereof and in communication with the reservoir, a pair of longitudinally extending lugs formed at the opposite end of the block providing bearings for the ends of the hinge pin, and engaging pockets for the driving sprockets of the truck, and means for locking the pin against rotation in relation to the extending portions.

2. A track link comprising a rectangular body portion, an oil reservoir in one end thereof, a laterally extending bearing through the opposite end thereof and in communication with the reservoir, a pair of longitudinally extending lugs formed at the opposite end of the block providing bearings for the ends of the hinge pin and engaging pockets for the driving sprockets of the truck, means for locking the pin against rotation in relation to the extending portions, and a removable grouser plate secured to the under face of each of the links.

3. A track chain comprising a series of connected links, each link having a filled in central body portion, a bearing member centrally arranged on one end of said body portion, a pair of spaced bearing members on the opposite end of the body portion between which the centrally arranged bearing member on the adjacent link fits, and a shoulder on each side of each link forming in conjunction with the overlapping ends of the adjacent link, recesses or pockets to receive a tooth of a sprocket wheel.

4. A track chain comprising a series of connected links, each having a body portion, an attenuated end on the body portion provided with a transverse opening, the attenuation being such as to leave a shoulder at each side of the body portion, bifurcated members on the opposite end of the body portion also provided with transverse openings, the attenuated end of one link being adapted to fit between the bifurcated ends on the adjoining link, a pin passing through the openings in said ends for connecting adjoining links together, said links when assembled having a space between each bifurcated end and a shoulder of the adjoining link such as to form pockets or recesses to receive the teeth of a sprocket wheel.

In testimony whereof I have hereunto set my hand in the presence of two subscribing witnesses.

GEORGE T. ARTHUR.

Witnesses:
F. W. TARR,
F. A. WEAVER.